Dec. 5, 1961 L. BANKS 3,012,198
TESTER
Filed Sept. 1, 1959
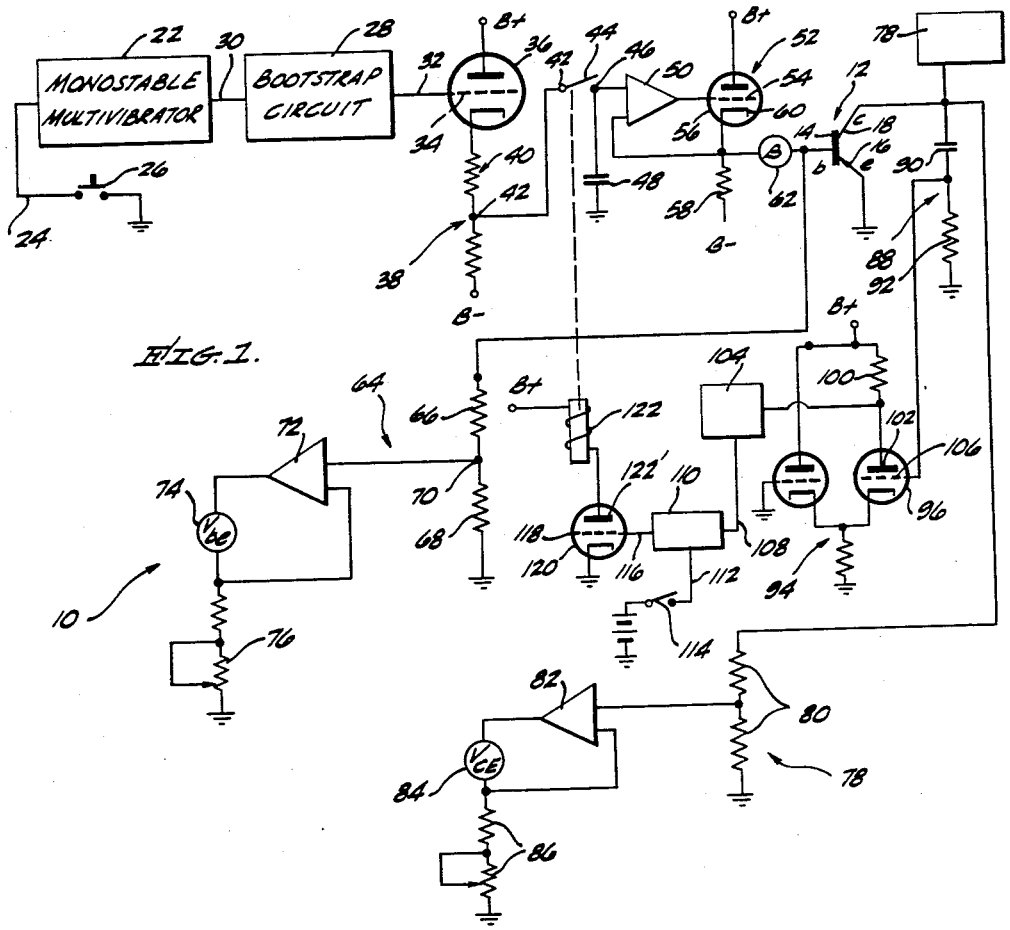
FIG. 1.
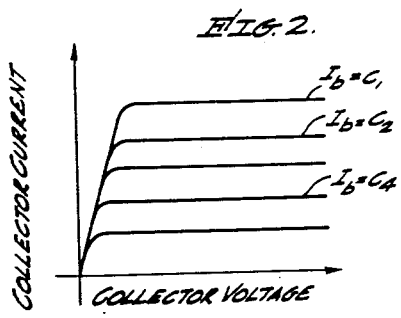
FIG. 2.
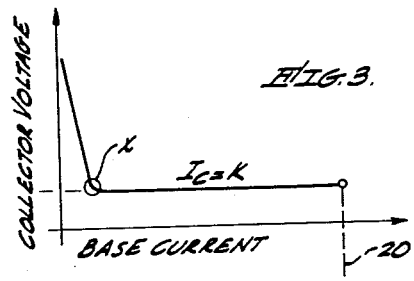
FIG. 3.
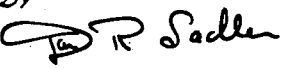
INVENTOR.
LESTER BANKS,
BY
D R Sadler
ATTORNEY.

United States Patent Office 3,012,198
Patented Dec. 5, 1961

3,012,198
TESTER
Lester Banks, Los Angeles, Calif., assignor to Hughes Aircraft Company, Culver City, Calif., a corporation of Delaware
Filed Sept. 1, 1959, Ser. No. 837,390
12 Claims. (Cl. 324—158)

The present invention relates to transistors and more particularly to means for testing the characteristics thereof.

A junction transistor is a semiconductor device having alternate portions possessing charge carriers of different polarity that are joined together by barrier regions or junctions. By supplying certain input signals to the various portions or electrodes of the transistor the transistor will be effective to produce corresponding output signals that possess certain predetermined relationships to the input signals. However, the relationships between these input and output signals are critically dependent on the exact composition and size of the various conductive portions and barrier regions of the transistor. At the present time it is extremely difficult, if not impossible, to accurately control these factors with the required degree of accuracy needed for mass production methods. Accordingly, when transistors are being mass produced it is essential to individually test each of the transistors with sufficient accuracy to determine whether or not its characteristics are within predetermined limits.

For certain transistor applications, such as in switching circuits, it is highly desirable to maintain the saturation voltage (collector-to-emitter voltage), and D.C. (direct-current) beta (ratio of collector current to base current) within preset tolerances. Accordingly, the finished transistors are individually tested to determine whether or not these are within the required tolerances. Heretofore, it has been customary to perform such test by manually subjecting the transistors to predetermined operating conditions and then determining the various currents and voltages in the transistor. These values are then used to compute the desired characteristics. Such a process is not only too slow and time consuming an operation to be suitable for mass production but it also requires the services of specially trained personnel. This further increases the costs of the tests and also introduces the possibility of human error.

It is therefore an object of the present invention to provide high speed means for economically and accurately determining the desired characteristics of a transistor without the use of skilled personnel.

This and other objects are to be accomplished by providing a test apparatus into which a transistor may be placed for automatically determining the characteristics thereof. More particularly, the test apparatus includes means for gradually varying the base current throughout a predetermined range. When the saturation condition is reached there will be an abrupt change in the response of the collector current to the variations in the base current. This abrupt change in the response of the collector current is sensed by means of a suitable circuit that is effective to stabilize the base current and maintain the operation of the transistor at the saturation point. The various values of current and voltage are then indicated to permit a quick manual sorting or are effective to produce an automatic sorting of the transistors.

In the drawings:

FIGURE 1 is a circuit diagram, partly in block form, of a transistor testing apparatus embodying the present invention; and FIGURES 2 and 3 are graphs of the operating characteristics of a typical transistor to be tested.

Referring to the drawings in more detail, the present invention is embodied in a test apparatus 10 particularly adapted to be employed for testing a transistor 12 having a base 14, an emitter 16 and a collector 18. The transistor 12 may be utilized in any one of several well known configurations. However, when placed in the test apparatus 10, it will be electrically connected to operate in a so-called grounded emitter manner. The characteristics of such a transistor 12 are illustrated by the graphs in FIGS. 2 and 3.

The graph in FIG. 3 is obtained by using the collector current $I_c$ as a parameter, the base current $I_b$ as the independent variable and the collector voltage $V_c$ as the dependent variable. Thus if the collector current $I_c$ is held constant and the base current $I_b$ is gradually decreased from some initial amount 20, the collector voltage $V_c$ will remain substantially constant until the point "X" is reached. This point "X" corresponds to saturation conditions and any further decreases in the base current $I_b$ will cause a very abrupt and drastic rise in the collector voltage. As can be seen from this graph there is a very sharp break in the curve at this point. This may also become apparent by examining the family of curves in FIG. 2.

It may thus be seen that if the base current gradually decreases from some predetermined initial amount, the collector voltage will be substantially constant over a wide range but will experience a very abrupt change when saturation conditions are reached. It is this effect that the present tester is intended to take advantage of.

This tester 10 includes a conventional monostable or one-shot multivibrator 22 having an input 24 that is controlled by a manually actuated switch 26 connected between input 24 and ground and an output that is connected to a bootstrap circuit 28 by a conductor 30. Normally, the multivibrator 22 will remain in its stable condition and the voltage on the conductor 30 will be some predetermined amount. However, whenever the switch 26 is closed momentarily, the multivibrator 22 will go into its astable condition. In the present instance, the multivibrator 22 is designed so that the voltage on conductor 30 will drop to a more negative level or produce a negative pulse when it is triggered. This condition will persist for some finite interval such as two seconds depending on the time constant of the multivibrator and then the multivibrator will return to its stable state.

It may thus be seen that normally the multivibrator 22 will have a substantially constant output voltage. However, when the button is closed the multivibrator 22 will go into its astable condition and produce a negative square wave.

The bootstrap circuit 28 is of conventional design and has the input connected to the conductor 30 so as to be responsive to the negative square wave. This circuit 28 is adapted to produce an ever increasing voltage whenever the negative pulse from te multivibrator 22 is present at the input thereof. Thus whenever the multivibrator 22 is in its stable condition the output of the bootstrap circuit 28 will be substantially constant. However, when the multivibrator 22 is forced into its astable condition, the output voltage from the bootstrap circuit 28 will increase and thus produce a positive going sawtooth pulse having a duration equal to that of the multivibrator output wave.

The output conductor 32 from the circuit 28 is connected to the control grid 34 of a vacuum tube 36. This tube 36 is arranged in a cathode follower circuit 38 having a voltage dividing network 40 connected to the cathode of the tube. The center junction 42 of this network 40 is connected to one pole 42 of a relay actuated switch 44. The other pole 46 of the switch 44 is connected to a grounded capacitor 48.

The switch 44 is normally retained in its closed position so that the potential on the voltage divider 40 will be supplied directly to the capacitor 48. Since the capacitor 48 has one side thereof grounded, it will be charged through the resistors in the network 40. The time constant of this circuit is preferably sufficiently short to insure the charge on the capacitor 48 closely following the sawtooth output pulse from the bootstrap circuit 28. When the switch 44 is opened the capacitor 48 will be disconnected from any charging or discharging circuit. The capacitor 48 will thus act as a "memory" for the potential that was on the switch 44 at the instant of time the switch 44 opened.

The capacitor 48 is connected across the input of a D.C. amplifier 50 which feeds a second cathode follower 52. Thus the voltage on the grid 54 of the vacuum tube 56 will follow the voltage across the capacitor 48. This in turn will produce a corresponding voltage across the cathode resistor 58. It may be seen that the D.C. amplifier 50 and cathode follower 52 will adequately isolate the capacitor 48 from the rest of the circuit to insure the charge being retained thereon for an extended period of time.

The cathode 60 of the vacuum tube 56 is connected to the base 14 of the transistor 12 by means of a current meter 62. This meter is effective to indicate the direct current flowing therethrough to the base 14 of the transistor 12. Although the meter 62 indicates base current, as a matter of convenience it may be calibrated in terms of beta.

In addition to the meter 62 for indicating base curernt $I_b$, a voltmeter circuit 64 may be connected to the base 14 to indicate the base-to-emitter voltage $V_{be}$. In order to reduce loading of the input circuit to the transisor 12 this voltmeter circuit 64 is essentially a conventional so-called vacuum tube voltmeter having a very high input impedance. It includes a pair of voltage dividing resistors 66, 68 that extend from the base 14 to the emitter, i.e., ground. The junction 70 between these resistors 66, 68 is connected to the input of a D.C. amplifier 72 which in turn is connected to an indicating voltmeter 74. The other side of the meter 74 is in turn connected to calibrating resistors 76. Since the emitter is at ground and this meter indicates the voltage at the center of a voltage divider extending from the base to ground, the meter will be effective to indicate the base-to-emitter voltage $V_{be}$.

Although the emitter 16 is connected directly to ground, the collector 18 is connected to a constant current generator 78. This generator 78 may be of any conventional design suitable for maintaining the collector current $I_c$ constant at some predetermined fixed amount. It may thus be seen that when the multivibrator 22 is put into its astable condition, the capacitor 48 will be charged at a substantially uniform rate. The voltage across the capacitor 48 will be fed through the D.C. amplifier 50 and cathode follower 52 and applied to the base 14 of the transistor 12. Since the collector current $I_c$ will be held constant by the generator 78, the operation of the transistor 12 will progress along the line represented in FIG. 3.

The collector 18 is also connected to a vacuum tube voltmeter 78 that measures the voltage between the collector 18 and ground or $V_{ce}$. This voltmeter 78 is essentially the same as the first voltmeter 64 in that it includes a high impedance input 80, a D.C. amplifier 82, a voltmeter 84 and calibrating resistors 86 all connected in series.

In addition, the collector 18 is connected to a differentiating circuit 88 that includes a capacitor 90 and a resistor 92 that is grounded. When the current $I_b$ is varying through the range where the collector voltage $V_{ce}$ remains substantially constant, the voltage across the differentiating circuit 88 will be substantially constant and there will be no voltage across the resistor 92. However, when the knee of the curve (point "X") is reached, there will be an abrupt change across the circuit 88 and a resultant negative pulse across the resistor 92.

The junction between the resistor 92 and capacitor 90 is connected to the input of a differentiating amplifier 94 so that the negative pulse will be applied thereto. This amplifier 94 comprises a pair of tubes 96, 98 that are disposed in parallel. The input tube 96 has a load such as a plate resistor 100 in the plate circuit and has the plate 102 connected directly to the input of a one-shot or monostable multivibrator 104. Normally, the load 100 will have a voltage drop thereacross but when the negative pulse is applied to the control grid 106 of the tube 96, there will be a decrease in the plate current and a corresponding decrease in the voltage drop across the load 100. This will appear as a positive pulse in the input to the multivibrator 104. This positive voltage pulse will cause the multivibrator 104 to change from its stable state to its astable state for a short interval of time. This in turn will produce a negative pulse in the output that is of relatively short duration.

The output of the multivibrator 104 is connected to one input 108 of a conventional flip-flop circuit 110. This circuit 110 is bistable and will remain in either state until it is forced into the other state by an externally applied pulse. The other input 112 is connected to a manually actuated reset switch 114.

The output 116 of the flip-flop circuit 110 is connected to a control grid 118 of a vacuum tube 120. The plate 122' of the tube 120 is connected to a relay coil 122 for opening and closing the switch 44. When the flip-flop circuit 110 is in its normal or reset condition the bias on grid 118 will be sufficiently negative to keep the coil 122 de-energized and thus allow the switch 44 to remain closed. However, whenever the flip-flop circuit 110 is in the set condition, the grid bias will be sufficiently positive to cause the plate current to energize the coil 122 and open the switch 44.

Whenever it is desired to check a transistor 12, the transistor 12 is first connected into the tester circuit as shown in FIGURE 1. That is, the emitter 16 is grounded, the base 14 is connected to the beta meter 62 and the collector 18 is connected to the constant current source 78. The operator then manually depresses the control button so as to close the switch 26 and thereby ground the input to the multivibrator 22. When this occurs the monostable multivibrator 22 will go into its astable condition and will remain there for some limited period such as approximately two seconds. This will cause the output voltage of the multivibrator 22 to become more negative and thereby actuate the bootstrap circuit 28. The voltage in the output of this circuit 28 will become progressively more positive and thereby produce a sawtooth pulse wave having a time duration equal to the period of the multivibrator 22. This sawtooth pulse will be fed through the cathode follower 38 and the closed switch 44 to the capacitor 48. This capacitor 48 will then commence to become charged corresponding to the sawtooth pulse. The voltage across this capacitor 48 is then applied to the input of the D.C. amplifier 50 and fed through the cathode follower 52 to the base 14 of the transistor 12. Thus this increasing voltage will cause the base voltage to gradually sweep across an operating range. As a result, the base current will decrease from some predetermined initial amount 20 toward the zero level. As can be seen from FIGURE 3, since the collector current $I_c$ is maintained constant by the current source 78 the collector voltage $V_{ce}$ will remain substantially constant over an extended range. This constant collector voltage $V_{ce}$ across the differentiating circuit 88 will result in a substantially constant voltage across the resistor 92. As a result, the differentiating amplifier 94 will not affect the condition of the one-shot multivibrator 104. This in turn will cause the flip-flop circuit 110 to remain in the reset condition and the relay coil 122 de-energized whereby the switch 44 will remain in the closed position.

When the base current $I_b$ has decreased to an amount corresponding to point "X" the collector voltage $V_{ce}$ will very rapidly begin to increase from the substantially constant amount to a greater amount. This abrupt change in the collector voltage $V_{ce}$ will increase the voltage across the differentiating circuit 88. This abrupt change will cause a rapid decrease in the voltage drop across the resistor 92, i.e., a negative pulse. This negative pulse will be effective to actuate the differentiating amplifier 94 and produce a corresponding positive pulse on the plate 102 of the input tube 96. This pulse will trigger the multivibrator 104 into its astable state and cause a negative pulse of sufficient duration and amplitude to set the flip-flop circuit 110. This in turn will apply a more positive bias to be applied to the grid 118 of the tube 120. The resultant increase in the plate current will energize the relay 122 and open the switch 44. This will result in isolating the capacitor 48 from any charging or discharging circuits. Thus although the output from the cathode follower 52 continues to sweep through its predetermined range, the voltage across the capacitor 48 will remain substantially constant. This constant voltage is applied by means of the D.C. amplifier 50 and cathode follower circuit 52 to the base 14 of the transistor 12. It should be noted that since the condenser 48 is disconnected from any discharge path this condition will be maintained for an indefinite period. During this period the operator can read the value of beta, $V_{be}$ and $V_{ce}$ on the meters and/or a suitable automatic sorting equipment may be actuated to classify the transistor 12 according to its characteristics.

When the transistor has been adequately tested, the operator may momentarily close the switch 114 and apply a reset pulse to the flip-flop circuit 110. This will reset the flip-flop 110 and cause the relay 122 to be de-energized whereby the switch 44 will close. The capacitor 48 will then be free to discharge through the resistors in the divider 40 and thereby make the tester ready for further testing.

I claim:

1. In a device for testing a transistor having a base electrode, an emitter electrode and a collector electrode, the combination of means adapted to be operatively interconnected with one of said electrodes for supplying thereto a progressively varying unidirectional input signal, and means adapted to be operatively interconnected with at least one of the other of said electrodes so as to be responsive to an output signal from said last mentioned electrode, said last mentioned means being operatively interconnected with said first mentioned means and effective to actuate said first means whereby said input signal will become a fixed amount whenever said output signal reaches a predetermined amount.

2. In a device for testing a transistor having a base electrode, an emitter electrode and a collector electrode, the combination of a signal source adapted to be operatively interconnected with one of said electrodes, said signal source being adapted to produce a unidirectional input signal that progressively varies throughout a predetermined range, means adapted to be operatively interconnected with at least one of the remaining electrodes so as to be responsive to an output signal from that electrode, said means being operatively interconnected with said signal source and effective to cause said source to produce a constant input signal whenever said output signal reaches a predetermined amount.

3. A tester for testing transistors having a base electrode, a collector electrode and an emitter electrode, said tester comprising a signal source adapted to be operatively interconnected with one of said electrodes for supplying a sweep signal thereto that varies through a predetermined range, said signal source including a memory device for producing a constant signal indicative of said sweep signal at some predetermined time, means adapted to be operatively interconnected with another of said electrodes and responsive to an output signal therefrom, said means being operatively interconnected with said signal source for actuating said memory device whenever the rate of change of said output signal reaches some predetermined amout.

4. A tester for testing transistors having a base, a collector and an emitter, said tester comprising a signal source adapted to be operatively interconnected with said base for supplying a unidirectional input signal thereto that progressively varies throughout a predetermined range, said signal source including a memory device for producing a constant signal indicative of said sweep signal at some predetermined instant of time, means adapted to be operatively interconnected with said collector and responsive to an output signal therefrom, said means being operatively interconnected with said signal source for actuating said memory device whenever said output signal reaches some predetermined amount.

5. A tester for testing transistors having a base, a collector and an emitter, said tester comprising sawtooth signal generating means adapted to be operatively interconnected with said base and adapted to apply a sawtooth input signal thereto, memory means adapted to be interconnected with said base and adapted to provide a constant input signal to said base indicative of the amplitude of said sawtooth signal at some predetermined time, an output circuit adapted to be operatively interconnected with said collector and responsive to an output signal therefrom, said circuit also being operatively interconnected with said means for actuating said memory means for maintaining said input signal at some predetermined amount.

6. A tester for testing transistors having a base, a collector and an emitter, said tester comprising a signal source operatively interconnected between said base and emitter for supplying a unidirectional input signal to said base, a constant current source interconnected between said collector and emitter for providing a constant collector current, means responsive to the voltage between said collector and said emitter coupled to said original source signal and adapted to cause said input signal to be constant when said voltage reaches a predetermined amount.

7. In a tester for testing transistors having a base, a collector and emitter, the combination of a variable voltage source for generating a varying signal, normally closed switch means operatively interconnecting said source with said base for supplying said signal to said base, storage means peratively interconnected with said base and responsive to said voltage and effective to maintain said voltage at a predetermined amount whenever said switch is open, a constant current source operatively interconnected with said collector for supplying a predetermined fixed amount of current thereto, and means responsive to the voltage on said collector for opening said switch whenever said collector voltage changes by a predetermined amount.

8. In a tester for testing transistors having a base, a collector and emitter, the combination of a sweep voltage source, switch means adapted to be operatively interconnected with said source and with said base for supplying a sweep current signal to said base, storage means adapted to be operatively interconnected with said base posterior to said switch means for maintaining the voltage on said base at a predetermined amount whenever said switch is open, a constant current source adapted to be operatively interconnected with said collector for providing a constant collector current, differentiating means adapted to be operatively interconnected with said collector and responsive to the voltage thereon, said last-mentioned means being responsive to changes in said collector voltage and effective to open said switch whenever the rate of change of said voltage exceeds some predetermined amount.

9. A transistor tester comprising a signal generator adapted to produce a sawtooth voltage pulse, circuit means interconnected with said signal generator and adapted to supply a current pulse to the base of said transistor, said circuit means including a switch and memory means posterior thereto, a constant current signal source operatively interconnected with said collector for supplying a constant collector current thereto, voltage differentiating means operatively interconnected with said collector and responsive to the voltage thereon, said differentiating means being adapted to open said switch whenever the rate of change of said collector voltage exceeds some predetermined amount.

10. A tester for testing transistors having a base, a collector and an emitter, said tester comprising a signal source for supplying an input current signal that progressively varies throughout a predetermined range, meter means adapted to operatively interconnect said source with said base for supplying said input signal thereto and indicating the amount of base current, said signal source including a memory device for producing a constant signal indicative of said sweep signal at some predetermined instants of time, means adapted to be operatively interconnected with said collector so as to be responsive to an output signal therefrom, said last-mentioned means being operatively interconnected with said signal source for actuating said memory device whenever said output signal reaches some predetermined amount.

11. A tester for testing transistors having a base, a collector and an emitter, said tester comprising a signal source effective to generate a unidirectional input current signal that varies throughout a predetermined range, meter means for operatively interconnecting said source with said base for supplying said input signal thereto and indicating the amount of base current, a constant current source adapted to be interconnected with said collector for providing a constant collector current, means responsive to the voltage between said collector and said emitter and adapted to cause said input signal to be constant when said voltage reaches a predetermined amount, and meter means for indicating the amount of said voltage.

12. A transistor tester comprising a signal generator adapted to produce a sawtooth voltage pulse, circuit means interconnected with said signal generator and including meter means adapted to be interconnected with the base of said transistor and effective to produce an indication of the base current, said circuit means including a switch and memory means anterior to said meter means, a constant current source operatively interconnected with said collector for supplying a constant current thereto, voltage differentiating means adapted to be operatively interconnected with said collector and responsive to the voltage thereon, said differentiating means being adapted to open said switch whenever the rate of change of said collector voltage exceeds some predetermined amount whereby the input signal to said base will be a fixed amount, and meter means operatively interconnected with said base and collector for indicating the voltages thereon.

References Cited in the file of this patent
UNITED STATES PATENTS
2,847,645     Thomas _____ Aug. 12, 1958
OTHER REFERENCES
Gutterman: "Electronics," July 1953; pages 172–175.
Bordash: "Non-Destructive Transistor Punch-Thru Test," Electronic Design, February 5, 1958.